United States Patent [19]

Lang

[11] 4,020,748
[45] May 3, 1977

[54] VALVE STRUCTURE FOR HYDRAULIC CONTROL SYSTEM

[75] Inventor: Armin Lang, Schwabisch-Gmund, Bettingen, Germany

[73] Assignee: Zahnradfabrik Friedrichshafen AG, Friedrichshafen, Germany

[22] Filed: Sept. 3, 1974

[21] Appl. No.: 502,663

[52] U.S. Cl. .................. 91/449; 91/455; 91/457; 137/596.13; 137/625.12; 137/625.48
[51] Int. Cl.² .................. F15B 11/08; F15B 13/04
[58] Field of Search ............ 91/433, 434, 449, 455, 91/457; 60/402; 180/79.2 R, 79.2; 137/625.69, 625.3, 625.48, 625.42, 596.13, 625.12

[56] References Cited

UNITED STATES PATENTS

| | | | |
|---|---|---|---|
| 2,708,909 | 5/1955 | Curlett | 91/447 X |
| 2,949,097 | 8/1960 | Vander Kaay | 137/625.42 X |
| 3,012,576 | 12/1961 | Williams | 137/596.13 |
| 3,198,212 | 8/1965 | Junck et al. | 137/625.69 X |
| 3,329,170 | 7/1967 | Petersen | 137/625.69 |
| 3,391,708 | 7/1968 | Rice | 137/625.69 |
| 3,403,512 | 10/1968 | Malott | 180/79.2 X |
| 3,553,966 | 1/1971 | Liebert | 60/402 X |
| 3,556,155 | 1/1971 | McWilliams | 137/625.3 |

FOREIGN PATENTS OR APPLICATIONS

| | | | |
|---|---|---|---|
| 851,516 | 10/1960 | United Kingdom | 137/625.69 |

Primary Examiner—Irwin C. Cohen
Attorney, Agent, or Firm—Karl F. Ross; Herbert Dubno

[57] ABSTRACT

A valve piston in an automotive power-steering system has a pair of inner peripheral grooves, defined by confronting lands of adjoining piston heads, normally communicating with the high-pressure side of an oil pump via symmetrical branch channels and with the low-pressure side of that pump via a common return channel. The piston also has a pair of outer peripheral grooves, normally cut off from the adjoining inner grooves, connected to opposite cylinder chambers of a hydraulic servomotor. The inner grooves communicate with a pair of axial piston bores receiving fixed or spring-loaded plungers for exerting a counteracting hydraulic pressure upon the piston upon a displacement thereof from its centered position, such displacement also opening the path from one branch channel via the corresponding inner groove and the adjoining outer groove to a corresponding servomotor chamber. The lands bounding the inner grooves are so shaped that, upon any piston shift away from the centered position, a progressive throttling of the return path to the low-pressure side occurs at one inner groove substantially simultaneously with the establishment of a connection between the other inner groove and the adjoining outer groove, followed by a blocking of the return path from that other inner groove before complete cutoff of that connection.

6 Claims, 5 Drawing Figures

VALVE STRUCTURE FOR HYDRAULIC CONTROL SYSTEM

FIELD OF THE INVENTION

My present invention relates to a valve structure for a hydraulic control system such as, for example, a hydrostatic power-steering system for automotive vehicles.

BACKGROUND OF THE INVENTION

In commonly owned U.S. Pat. No. 3,553,966, granted to Karl-Heinz Liebert, there has been disclosed an automotive steering system of this type wherein the flow of hydraulic fluid (referred to hereinafter as oil) from a main pump to a servomotor and an associated ancillary or metering pump is controlled by a valve structure forming two cylinders for a primary and a secondary valve piston which are manually displaceable in opposite directions by the driver of the vehicle. The primary valve piston has two pairs of peripheral grooves, i.e. an inner pair on opposite sides of a central plane of symmetry and an outer pair disposed between these inner grooves and the piston ends, these grooves being defined by axially spaced piston heads whose peripheral surfaces coact with the peripheral cylinder surfaces in establishing various flow paths. In the normal, centered position of the piston, its inner grooves communicate with the low-pressure side of the oil source, constituted by the aforementioned main pump and an associated reservoir or sump, and also with the high-pressure side of that source so that the oil is continually and ineffectually recirculated; the outer grooves are then cut off from the source. These outer grooves, in turn, open toward a pair of channels which lead to the servomotor and the ancillary pump via the secondary valve cylinder. Moreover, the inner grooves of the primary valve piston give access to respective axial bores in the piston which are partially occupied by a pair of fixed or spring-loaded plungers designed, upon a shifting of that piston into an off-center position, to exert a reaction force giving the driver a simulated feeling of road resistance even as the servomotor is actuated to steer the vehicle to one or the other side. These two axial bores may thus be regarded as branches of a hydraulic load circuit also including the two channels which extend to the servomotor and the ancillary pump.

In systems of this or a similar nature it has heretofore been the practice, as also shown in the Liebert patent, to provide the piston heads with transverse lands bounding the intervening grooves, these lands forming flow-controlling edges which together with similar cylinder edges instantaneously block or unblock the associated oil passages upon a shifting of the piston. As the piston and cylinder edges approach each other to throttle the flow upon incipient closure of a passage, the oil experiences a sharp deflection in a radial direction which may give rise to annoying and therefore undesirable whistling noises.

OBJECTS OF THE INVENTION

The general object of my present invention is to provide an improved valve structure in such a hydraulic control system which is less noisy than those of the prior art.

A more particular object is to provide a piston configuration for such a valve structure allowing a gradual cutoff of an oil passage in the course of a piston stroke serving to unblock a previously blocked passage on the opposite side of the central plane.

SUMMARY OF THE INVENTION

A valve structure according to my present invention comprises a piston whose piston heads form a pair of first lands facing a common transverse plane and adjoining a pair of first piston-head surfaces which coact with respective first cylinder surfaces to establish normally open first passages from the high-pressure side of the oil source to respective branches of the load circuit, the piston heads further forming a pair of second lands averted from that common plane and adjoining second piston-head surfaces which coact with respective cylinder surfaces establishing normally open second passages from the high-pressure side to the low-pressure side of the source, generally as disclosed in the aforementioned Liebert patent but with the characteristic distinction that the first passages are substantially wider than the second passages in the centered piston position. Thus, a shift of the piston into an off-normal position, serving to throttle the idle oil circulation through one of these second passages in order to build up oil pressure in the corresponding first passage, does not close the opposite first passage until the piston has moved beyond this initial throttling pistion.

According to another feature of my invention, the active piston-head surfaces are at least partly beveled or otherwise inclined with reference to the piston axis so as to deflect the oil flow at an angle substantially less than 90° from the axial direction upon a piston shift constricting any of these passages. More particularly, the first piston-head surfaces are beveled at a relatively large angle to the piston axis (preferably up to about 45°) whereas the second piston-head surfaces have zones inclined at a relatively small angle to that axis (e.g. about 5° to 10°). Upon a shifting of the piston from a centered position, each beveled first piston-head surface coacts with its associated first cylinder surface to block the respective first passage prior to complete obstruction of the respectively opposite second passage by coaction of the inclined zone of the corresponding piston-head surface with its associated second cylinder surface. In this way, a gradual pressure buildup in the selected branch of the load circut is completed only after the complete cutoff of the oil supply to the other branch.

Advantageously, the inclined zones of the second piston-head surfaces are separated from the adjacent second lands by zones parallel to the piston axis and are bounded, on the sides opposite these parallel zones, by short transverse shoulders. These parallel and inclined zones could extend completely around the piston head, forming cylindrical and frustoconical surface portions thereof, or could be confined to a plurality of peripherally spaced chamfers on the piston head. In this latter instance, the second piston-head surfaces fit closely into the associated second cylinder surfaces so that, over the range of progressive pressure buildup, the oil flow continues only through restricted pathways defined by these chamfered zones.

BRIEF DESCRIPTION OF THE DRAWING

The above and other features of my invention will now be described in detail with reference to the accompanying drawing in which.

SPECIFIC DESCRIPTION

Figure 1:
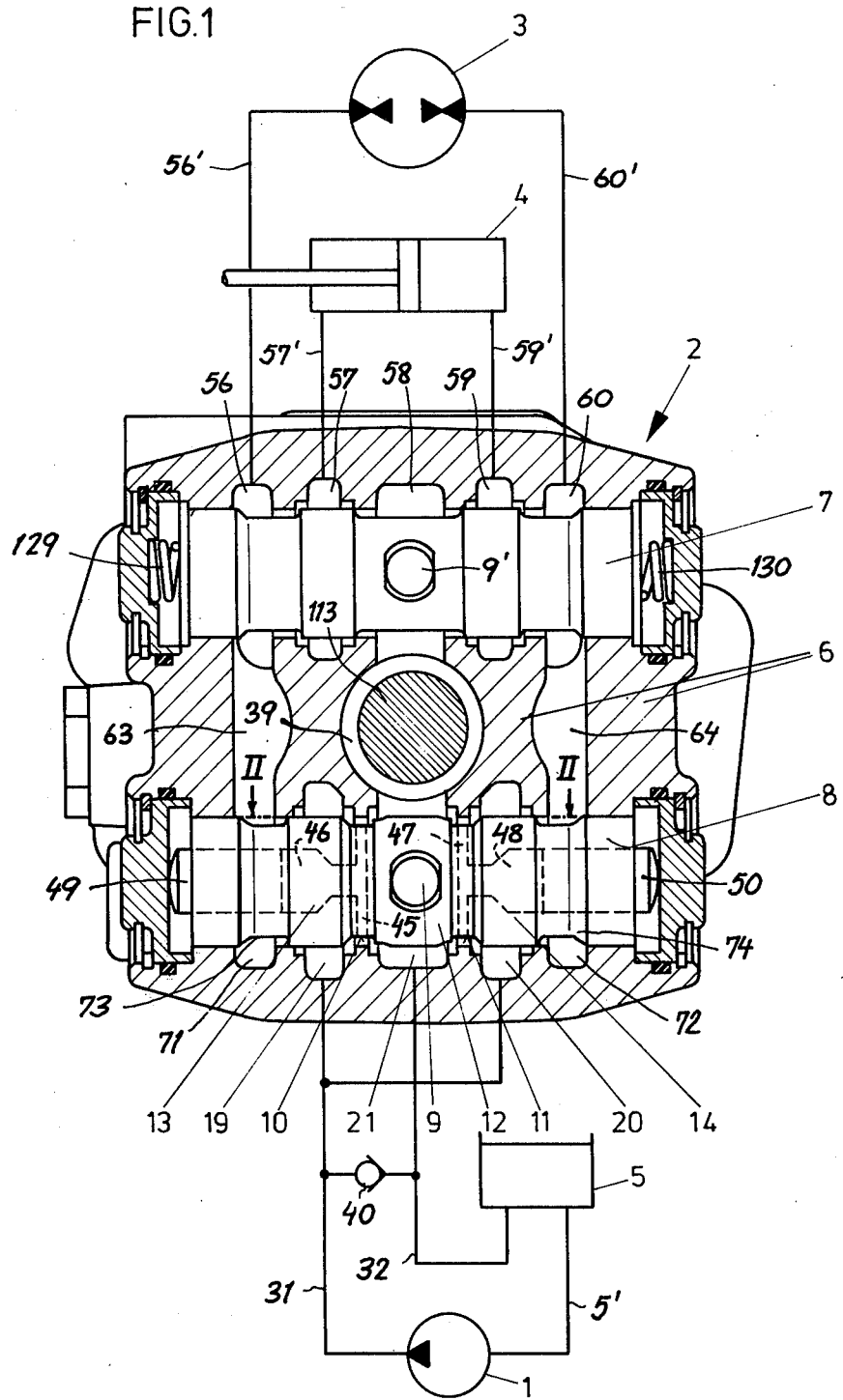
FIG. 1 is a cross-sectional view of a valve structure according to my invention, included in a schematically illustrated hydrostatic control system of the type disclosed in the aforementioned Liebert patent.

In FIG. 1 I have diagrammatically indicated the principal elements of a power-steering system of the type disclosed in Liebert U.S. Pat. No. 3,553,966, including a main oil pump 1, a housing 6 forming part of a valve structure 2, an ancillary pump 3, a servomotor 4, an oil sump 5, and associated conduits, namely a high-pressure conduit 31 connected to the discharge part of pump 1, a low-pressure conduit 32 leading back to sump 5, a return line 5' extending from the sump to the intake port of pump 1, a line 56' extending from a cylinder groove 56 in housing 6 to one port of pump 3, a line 60' linking the opposite port of that pump with a cylinder groove 60 in housing 6, and two lines 57', 59' connecting opposite sides of servomotor 4 with respective cylinder grooves 57 and 59 of housing 6. Lines 31 and 32 are bridged by a check valve 40. Housing 6 is formed with two parallel cylinders for a pair of pistons 7 and 8, the latter constituting the aforementioned primary valve piston whose position controls the admission of oil from supply conduit 31 to a pair of channels 63, 64 communicating via cylinder grooves 56 and 60 with lines 56' and 60', respectively. Channels 63 and 64, forming two branches of a circuit for the supply of oil to the hydraulic load 3, 4, open into a pair of outer cylinder grooves 71, 72 controlled by respective lateral piston heads 13, 14 of valve piston 8; in the illustrated centered position of piston 8, grooves 71 and 72 are cut off by heads 13 and 14 from a pair of intermediate grooves 19 and 20 which are continuously supplied with oil from conduit 31. A central cylinder groove 21, connected to return conduit 32, communicates in that centered position with grooves 19 and 20 via a pair of inner piston grooves or annular recesses 10 and 11, on opposite sides of a middle piston head 12, which are flanked by outer piston grooves 73 and 74 registering with cylinder grooves 71 and 72, respectively. The central groove 21 of the primary valve cylinder is connected through a passage 39, accommodating a control shaft 113, with a similar groove 58 in the secondary valve cylinder.

Via a linkage fully disclosed in the Liebert patent, of which only a pair of pins 9 and 9' have been shown in FIG. 1, rotation of shaft 113 due to the turning of a nonillustrated steering wheel shifts the two pistons 7 and 8 in opposite directions from their centered position depicted in the drawing. Such a shift is resisted mechanically, in the case of piston 7, by a pair of springs 129, 130 and hydromechanically, in the case of piston 8, by a pair of spring-loaded plungers 49, 50 extending into axial bores 46, 48 which communicate with piston grooves 10 and 11 by way of respective transverse bores 45 and 47.

The operation of the system so far described is essentially identical with that disclosed in the Liebert patent and thus need be summarized only briefly. In the normal position illustrated in FIG. 1, oil from pump 1 circulates freely via cylinder grooves 19–21 and piston grooves 10 and 11 back to the sump 5. Bores 46 and 48, communicating with grooves 10 and 11, are therefore under low pressure; channels 63 and 64 are cut off from the fluid supply, as are the ancillary pump 3 and the servomotor 4.

Upon a turning of shaft 113 in, say, a clockwise direction, pistons 7 and 8 respectively shift to the right and to the left. The return flow from grooves 19 and 20 to the sump 5 is now blocked so that bore 46 is placed under fluid pressure resisting the leftward displacement of piston 8. Groove 20, also cut off from sump 5, is now open toward grooves 72 and 74 to pressurize the channel 64 which is disconnected by piston 7 from grooves 59 but communicates, by way of groove 60 and line 60', with pump 3. Via the intercommunicating grooves 56 and 57, line 56' feeds the output of pump 3 to line 57' while line 59' and groove 59 are now open to groove 58 leading to the sump 5. Pump 3 is therefore connected in series with servomotor 4 which operates to accelerate the displacement of pistons 7 and 8 in the aforementioned sense. Since the system is symmetrical, analogous operations take place upon a rotation of shaft 113 in the opposite (counterclockwise) direction.

Figure 2:
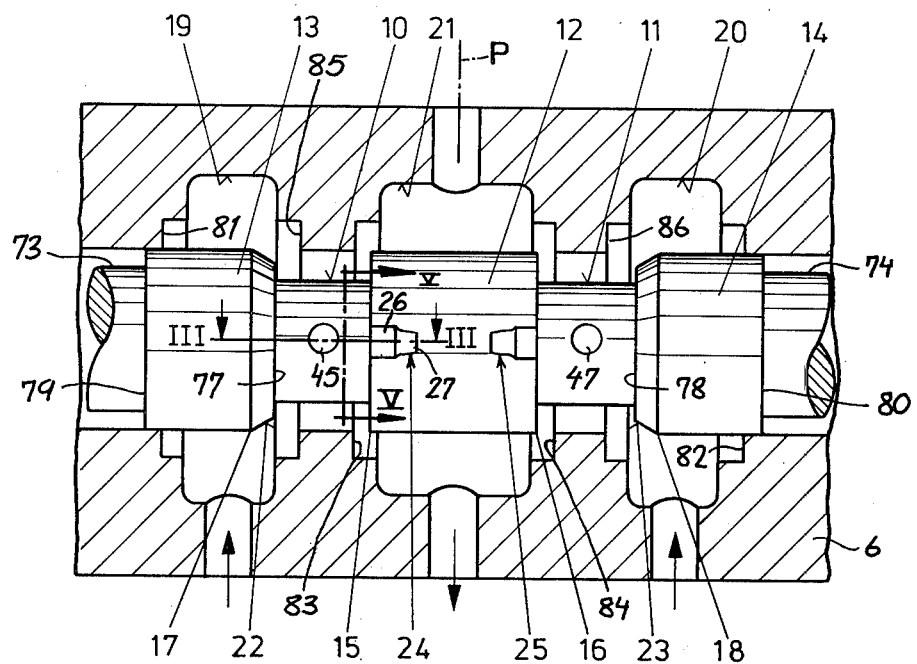
FIG. 2 is a fragmentary cross-sectional view taken on the line II—II of FIG. 1 and drawn to a larger scale.
Figure 3:
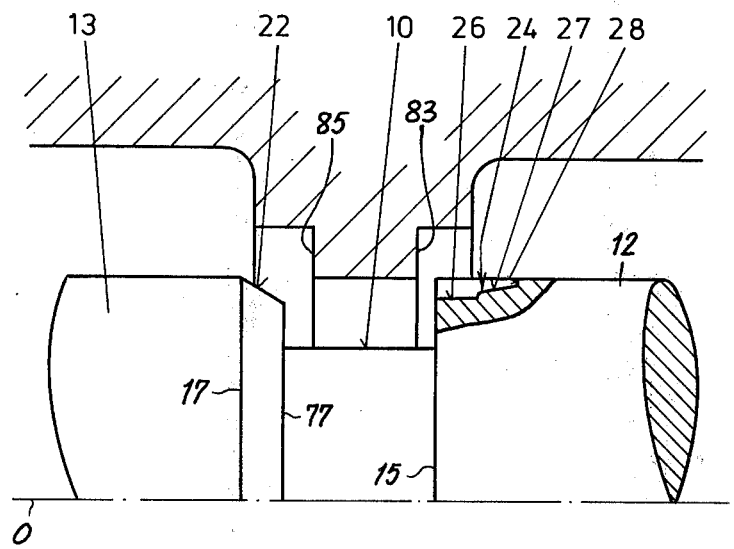
FIG. 3 is a cross-sectional view, drawn to a still larger scale, taken on the line III—III of FIG. 2.
Figure 5:
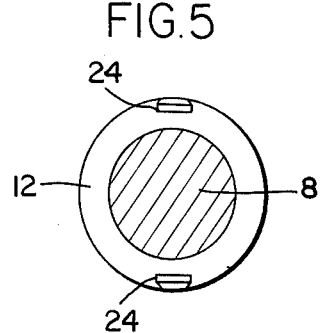
FIG. 5 is a cross-sectional view taken on the line V — V of FIG. 2.

FIGS. 2 and 3 show more clearly the piston heads 12–14 of valve piston 8 together with its inner grooves 10, 11 and its outer grooves 73, 74. Grooves 10 and 11 are defined by first lands 77 and 78 on heads 13 and 14, confronting the central transverse plane P of the piston, and by second lands on head 12 averted from that plane, these latter lands terminating in circular edges 15 and 16. Piston-head surfaces 22 and 23 are frustoconical extensions of lands 77 and 78 with major bases 17 and 18, their generatrices including an angle of about 30° with the piston axis O. Edges 15 and 16 adjoin a cylindrical peripheral surface of piston head 12, provided at diametrically opposite locations (see FIG. 5) with chamfers 24, 25 of stepped configuration, each of these chamfers comprising a flat zone 26 of rectangular outline and an inclined zone 27 ending in a transverse shoulder 28. The inclination of zone 27 with reference to axis O is less than 10°.

Piston heads 13 and 14 also have third lands with circular edges 79, 80 which bound the outer grooves 73 and 74 of piston 8 and which normally prevent the oil in cylinder grooves 19 and 20 from reaching the channels 63 and 64 as shown in FIG. 1. The spacing of edges 79 and 80 from coacting cylinder edges 81 and 82 substantially equals the axial separation of edges 15 and 16 from coacting cylinder edges 83 and 84 but is considerably less than the spacing of edges 17 and 18 from coacting cylinder edges 85 and 86. Thus, edges 17, 85 and 18, 86 define a pair of first passages which are substantially wider than a pair of second passages defined by edges 15, 83 and 16, 84. However, a leftward shift of piston 8 to a position of incipient communication between grooves 20 and 74, with piston edge 80 just clearing cylinder edge 82, does not completely block the passage between edges 15 and 83 since a restricted flow path for the oil will still exist at the radial clearances provided by the chamfers 24 of piston head 12. Upon a further leftward shift of the piston, edges 18 and 86 meet to block the first passage defined thereby, yet the axial length of chamfers 24 and 25 is such that some oil will still be able to pass around edge 83 until the piston has moved far enough to let edge 83 encounter the shoulder 28. As shown, this axial length of the chamfers is about twice that of the beveled surfaces 22, 23. Thanks to the beveled surface 23, the pressure in groove 72 builds up gradually in two stages, i.e. at a faster rate until the cut-off of piston groove 11 and then at a slower rate until the throttled passages 24 are blocked. The staggered closure of the two bypass paths provided by grooves 10 and 11 helps avoid the undesirable noises referred to above.

Owing to the small inclination of surfaces 27 with reference to the piston axis O, the axial oil flow from groove 19 or 20 to groove 21 will not be sharply deflected upon a throttling of its pathway by a shift of the piston; transverse shoulder 28 is of small height and comes into play only when the flow has almost stopped, without giving rise to any objectionable whistling.

Figure 4:
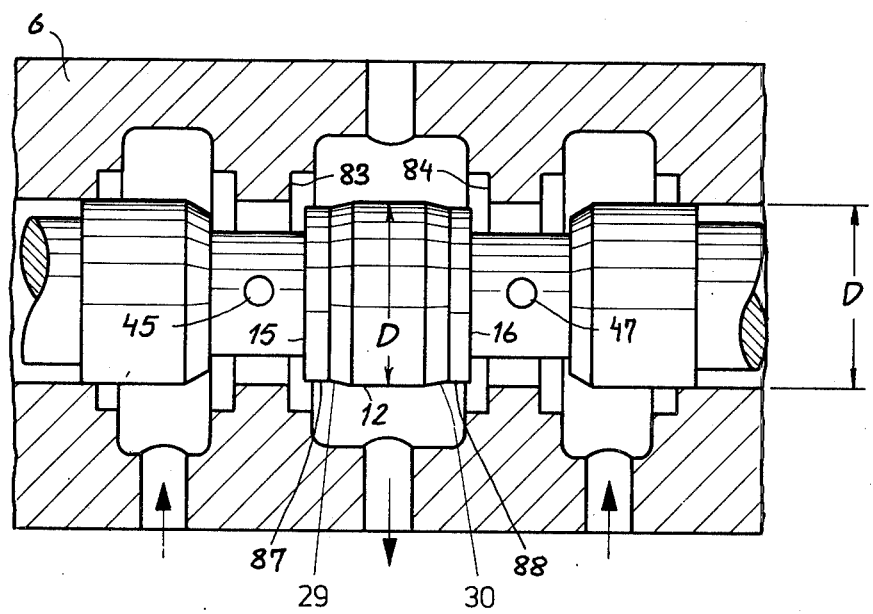
FIG. 4 is a view similar to FIG. 2, illustrating a modification.

The same advantage can also be realized, as shown in FIG. 4, if the central piston head 12 is formed adjacent its lands 15 and 16 with a pair of narrow cylindrical surfaces 87 and 88, of a diameter less than the cylinder diameter D at edges 83 and 84 to maintain a certain radial spacing therebetween, followed by frustoconical surface portions 29 and 30 flanking a central surface portion of diameter D. The profile of the peripherally continuous zones 29, 87 or 30, 88 may be similar to that of zones 26 and 27 (FIG. 3) and could also include a short transverse step, corresponding to shoulder 28, designed to create a certain amount of turbulence causing a rapid pressure reduction during closure.

I claim:

1. In a hydraulic control system including a source of hydraulic fluid with a high-pressure side and a low-pressure side, a valve cylinder with a plurality of inner peripheral grooves generally symmetrically disposed about a plane transverse to the cylinder axis and including a central groove, two intermediate grooves and two outer grooves, a valve piston slidable in said cylinder and provided with a plurality of piston heads including a middle head generally symmetrically flanked by two lateral heads which are axially separated from said middle head by a pair of annular recesses, a hydraulic servomotor, two branch conduits respectively communicating with said outer grooves and said servomotor, a common return conduit communicating with said central groove, said intermediate grooves communicating with said high-pressure side and said central groove communicating with said low-pressure side, said annular recesses interconnecting said central and intermediate grooves in a normal piston position whereby hydraulic fluid constantly recirculates from said high-pressure side to said low-pressure side, said piston being axially shiftable from said normal position to cut off both said intermediate grooves from said central groove and to connect one intermediate groove to the adjoining outer groove for pressurizing the corresponding branch conduit, said annular recesses communicating in said normal position with said intermediate grooves by a pair of first passages and with said central groove by a pair of second passages, said lateral heads having a pair of first annular lands facing said plane and defining said first passages with confronting first annular cylinder edges, said middle head having a pair of second annular lands averted from said plane and defining said second passages with confronting second annular cylinder edges, said conduits being provided with ancillary valve means for connecting said servomotor between said return conduit and the pressurized branch conduit in an off-normal piston position, and control means for jointly displacing said piston and said ancillary valve means, the improvement wherein the axial separation of said first lands from said first confronting edges substantially exceeds the axial separation of said second lands from said second confronting edges in said normal position, said middle head having peripheral areas adjacent said second lands radially spaced from a pair of adjoining inner cylinder surfaces by narrow clearances maintaining a restricted fluid flow through one of said second passages on one side of said plane upon a shifting of said piston to said one side into an off-normal position of zero axial separation between the corresponding first land and first confronting edge coinciding with incipient communication between said intermediate and outer grooves on the other side of said plane via metering means between said corresponding first land and first confronting edge, the other of said first passages on said other side closing only upon a further piston shift beyond said position of zero axial separation, said radially spaced areas being of sufficient axial width to maintain said restricted fluid flow through either of said second passages beyond the position of closure of the respectively opposite first passage.

2. The improvement defined in claim 1 wherein said lateral heads are provided with beveled surfaces defining said metering means, said beveled surfaces forming frustoconical extensions of said first lands and including with said axis a relatively large angle, said radially spaced areas including zones inclined at a relatively small angle to said axis whereby said restricted fluid flow on said one side is progressively throttled during gradual closure of said other of said first passages on said other side.

3. The improvement defined in claim 2 wherein said inclined zones are separated from said second lands by zones parallel to said axis.

4. The improvement defined in claim 3 wherein said inclined and parallel zones are annular and centered on said axis.

5. The improvement defined in claim 3 wherein said inclined zones are bounded by transverse shoulders opposite said parallel zones.

6. The improvement defined in claim 3 wherein said middle head fits closely into said adjoining cylinder surfaces, said inclined and parallel zones forming a plurality of peripherally spaced chamfers adjacent each of said second lands on said middle head.

* * * * *